United States Patent [19]

Allison, III et al.

[11] 4,370,433

[45] Jan. 25, 1983

[54] HIGH STRENGTH DIENE/MONOVINYL AROMATIC COPOLYMER-BASED ADHESIVES

[75] Inventors: George M. Allison, III, Bartlesville, Okla.; Mason S. Wilt, Borger, Tex.

[73] Assignee: Phillips Petroleum Company, Bartlesville, Okla.

[21] Appl. No.: 282,216

[22] Filed: Jul. 10, 1981

[51] Int. Cl.$^3$ .......................... C08L 93/00; C08F 2/00; C08F 4/00

[52] U.S. Cl. .................................. 524/274; 525/342; 525/359.5; 525/332.9; 526/89; 524/792

[58] Field of Search ............. 525/333, 342, 359.5; 260/27 BB; 526/89; 524/274

[56] References Cited

U.S. PATENT DOCUMENTS

| | | | |
|---|---|---|---|
| 3,078,254 | 2/1963 | Zelinski et al. | 260/45.5 |
| 3,198,774 | 8/1965 | Huxtable et al. | 260/83.7 |
| 3,244,664 | 4/1966 | Zelinski et al. | 260/41.5 |
| 3,280,084 | 10/1966 | Zelinski et al. | 260/83.7 |
| 3,281,383 | 10/1966 | Zelinski et al. | 260/23.7 |
| 3,639,367 | 2/1972 | Halasa | 525/359.5 |
| 3,639,521 | 1/1972 | Hsieh | 260/880 |
| 3,657,206 | 4/1972 | Halasa | 525/105 |
| 3,692,874 | 9/1972 | Farrar et al. | 525/105 |
| 3,939,131 | 2/1976 | Morikawa et al. | 260/80.7 |
| 3,993,613 | 11/1976 | Doss et al. | 260/27 BB |

FOREIGN PATENT DOCUMENTS 1014999 12/1965 United Kingdom .

*Primary Examiner*—H. S. Cockeram

[57] ABSTRACT

A highly branched copolymer particularly suitable for forming pressure sensitive adhesives prepared in the presence of specified amounts of tert-butylchloride. Conjugated diene monomers are copolymerized with monovinylaromatic monomers in the presence of an organolithium initiator and a suitable amount of tertiary butylchloride. The holding power of adhesives prepared thereby is greatly increased.

11 Claims, No Drawings

HIGH STRENGTH DIENE/MONOVINYL AROMATIC COPOLYMER-BASED ADHESIVES

BACKGROUND OF THE INVENTION

The present invention relates to the highly branched copolymers of conjugated dienes and monovinylaromatic compounds, which copolymers are particularly useful for forming adhesive compositions.

The preparation of highly branched copolymers, sometimes referred to as "radial" or "star" copolymers is well known in the art. Examples of such known processes are disclosed in U.S. Pat. No. 3,078,254 (Zelinski and Hsieh), U.S. Pat. No. 3,280,084 (Zelinski), U.S. Pat. Nos. 3,281,383 (Zelinski and Hsieh), and 3,639,517 (Kitchen et al), all assigned to Phillips Petroleum Company, the disclosures of which are incorporated herein by reference.

Many of the highly branched polymers that can be produced by the known processes have been found to be particularly useful as the polymeric base for pressure sensitive adhesives. Examples of polymers that are useful in formulating pressure sensitive adhesives include the radial block copolymers that are sold by Phillips Petroleum Company under the trademarks Solprene®411, 406, and 414.

The compounding of pressure-sensitive adhesives requires the balancing of numerous factors. The mass coat must be soft enough to flow under light pressure to wet the substrate and yet possess sufficient cohesive strength to withstand the stresses of the job it is designed to do. Thus, in addition to providing a material that is tacky an essential property is the holding power.

SUMMARY OF THE PRESENT INVENTION

The present invention is based on the discovery that if such highly branched copolymers are prepared in the presence of certain levels of tert-butylchloride, the holding power of adhesives prepared therefrom can be greatly increased.

Accordingly, the present invention is concerned with a novel method of preparing highly branched copolymers.

In another aspect, the present invention is directed to novel highly branched copolymers of conjugated dienes and monovinyl aromatic compounds.

In still another aspect, the present invention relates to novel pressure sensitive adhesive compositions.

DETAILED DESCRIPTION OF THE INVENTION

The copolymerization process of the present invention involves copolymerizing conjugated diene monomers with monovinylaromatic monomers in the presence of an organomonolithium initiator and a suitable amount of tert-butylchloride. The resulting monolithium terminated polymer is then reacted with a polyfunctional coupling agent having at least three functional groups capable of reacting with said polymer lithium to couple said coupling agent and said lithium terminated polymer segments.

The monomers which can be employed in the preparation of polymers containing terminal alkali metal atoms include a wide variety of materials. The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes the preferred material is butadiene, with isoprene and piperylene also being especially suitable.

The monovinylaromatic comonomers will generally include those containing 8 to 18 carbon atoms per molecule. Examples include styrene, ring substituted methyl styrenes, ethylstyrenes, t-butylstyrene, paramethoxystyrene, vinylnaphthalene, vinyltoluene, and the like.

Typically for preparing pressure sensitive adhesives, the weight ratio of conjugated diene monomer to monovinylaromatic monomer is in the range of about 50/50 to about 90/10, more generally about 60/40 to about 85/15.

Further, the especially preferred type of copolymers are the radial block copolymers that are prepared by reacting monovinylaromatic comonomer with the organolithium initiator until substantially all of the aromatic comonomer is polymerized, then adding to the resulting lithium terminated polymer the conjugated diene comonomer and continuing the reaction until substantially all of the diene comonomer is polymerized, and then adding the coupling agent and forming the branched copolymer.

The polymerization is conducted as known in the art in an inert hydrocarbon solvent such as isobutane, pentane, cyclohexane, benzene, toluene, xylene and the like. The polymerization is carried out in the absence of air, moisture, or other impurities known to be detrimental to such anionic catalyst systems. The temperature of polymerization may be conventionally from 0° to 120° C., and preferably between 40° to 80° C.

The total amount of initiator employed depends upon the molecular weight and the number of polymer chains of each type desired. Typically, about 0.25 to about 100 millimoles of initiator are employed per 100 grams of total comonomers.

Typically for preparing polymers useful for pressure sensitive adhesives, it is desirable for the final branched polymers to have molecular weights in the range of about 100,000 to about 500,000, more preferably about 150,000 to about 300,000.

The polyfunctional coupling agents suitable for the invention may be any of the materials known to have functional groups which can react with carbon to lithium bonds to add the carbon chain to the functional group. Typical examples of the suitable coupling agents are the polyepoxides, such as epoxidized linseed oil; the polyesters such as diethyl adipate, the polyhalides, such as silicon tetrahalide; the polyisocyanates, such as benzene-1,2,4-triisocyanate; the polyimines, such as tri(1-aziridinyl) phosphine oxide; the polyaldehydes, such as 1,4,7-naphthalene tricarboxaldehyde; the polyketones, such as 2,4,6-heptanetrione; the polyanhydrides, such as pyromellitic dianhydride; and the polyacid chlorides, such as mellitic acid chloride. The polyvinylaromatic compounds such as divinylbenzene, which although only difunctional as monomers, can polymerize to form polyfunctional agents in situ and serve as coupling agents. Suitable are the ortho-, meta-, or paradivinylbenzenes, or mixtures thereof.

The amount and type of coupling agent used is dependent upon the number of polymer chains having lithium terminated ends and the number of arms desired per star-block molecule. Thus, for agents having a fixed number of functional groups such as silicon tetrachloride, an equivalent of agent per equivalent of lithium terminated polymer chains, gives a four armed radial-block copolymer. In the case of difunctional agents which polymerize during the coupling reaction, such as divinylbenzene, the amounts of agent to be used must be determined for the conditions of reaction, since the number of equivalent functional sites is variable.

In accordance with the present invention, the polymerization and coupling are conducted in the presence of an amount of tertiary butylchloride that improves the holding power of an adhesive formulated from the polymer. Typically, the t-butylchloride is employed in an amount in the range of about 30 to about 165 parts by weight per million parts by weight of total comonomers.

The novel copolymers produced according to this invention can be employed with benefit in conventional pressure sensitive adhesive formulations. The major components generally used in such recipes in addition to the polymer are solvent, tackifier, and stabilizer.

A good solvent is generally one which will dissolve both the butadiene and styrene portions of the copolymer. Additional compounding ingredients such as resins can change the solubility characteristics of a polymer in a given solvent. Accordingly, a blend of solvents or even non-solvents can often be suitable. Typically, liquid aromatic compounds such as toluene, and xylene are employed either alone or in combination with naphtha.

The tackifiers generally used are rosin esters, α-pinene resins, and hydrocarbon resins. Further, Solprene ®1205 styrene-butadiene block copolymer available from Phillips Petroleum Company are in some cases employed as a means of enhancing tack. Another type of useful tackifier is low molecular weight polybutene such as that sold under the tradename Indopol L-14 by Amoco Chemicals Corporation. A typical rosin ester is, a glycerol rosin acid ester sold under the trademark Foral ®85.

Further understanding of the present invention and its advantages will be provided by the following examples:

EXAMPLE I

This example describes a preparation of a typical inventive polymer disclosed herein. The inventive copolymer is a conjugated dienemonovinylaromatic radial teleblock copolymer prepared by a known polymerization process but in the presence of tertiary-butylchloride (e.g. 5 parts per million parts solvent). The copolymer was prepared in accordance with the following recipe:

| | Parts by Weight |
|---|---|
| 1,3-Butadiene | 70 |
| Styrene | 30 |
| Cyclohexane | 650 |
| tert-Butylchloride | .00325 |
| Tetrahydrofuran | .05 |
| n-Butyllithium | .1 |
| Silicon Tetrachloride | .066 |
| Stabilizers: Butylated Hydroxy Toluene (BHT) | .4 |
| Tris-nonylphenyl-phosphite (TNPP) | .4 |

Preheated (60°–70° C.) cyclohexane was charged to a 20 gallon stirred reactor followed by tetrahydrofuran, tertiary butyl chloride (as a 0.2 weight percent cyclohexane solution), and styrene and the mixture stirred for a few minutes until the temperature reaches about 57° C. n-Butyllithium was added and the polymerization of styrene was initiated. After about 10–15 minutes the polymerization was complete as evidenced by a peak temperature 65° C. After the styrene peak temperature, 1,3-butadiene was added and a second polymerization was carried out (5–7 minutes). After the butadiene peak temperature, 95°–100° C., the silicon tetrachloride coupling agent was added and the mixture stirred for about 5 minutes. The run was then transferred to a blow-down tank where the stabilizers, BHT and TNPP, were added. The solution was then steam stripped to remove solvent and tray-dried at 71° C. (160° F.) to less than 0.75 weight percent volatiles. Additional runs were made similar to that described wherein various amounts of tertiary-butylchloride were employed. The properties of these copolymers are shown in Table I.

TABLE I

| | Copolymer Properties | | | |
|---|---|---|---|---|
| Run No. | TBC, ppm[a] | Mw/Mn[b] × 10$^{-3}$ | H.I.[b] | I.V.[c] |
| 1 | 0 | 300/200 | 1.36 | 1.45 |
| 2 | 5 | 269/242 | 1.11 | 1.49 |
| 3 | 10 | 229/199 | 1.15 | 1.45 |
| 4 | 25 | 235/202 | 1.16 | 1.45 |
| 5 | 50 | 251/216 | 1.16 | 1.43 |
| 6 | 100 | 226/195 | 1.16 | 1.45 |

[a]Tertiary-butylchloride, parts per million parts cyclohexane solvent.
[b]Weight average molecular weight/number average molecular weight as determined by Gel Permeation Chromatography (GPC). Heterogeneity index determined from GPC.
[c]Inherent viscosity determined according to procedure in U.S. Pat. No. 3,278,508, col. 20, notes (a) and (b). All polymers were gel free.

These results show that the intrinsic properties of the polymers obtained by polymerizing in the presence of tert-butylchloride are not substantially different than those obtained in the absence of the chloride.

EXAMPLE II

This example describes the procedures used to evaluate the copolymers prepared in Example I in adhesive formulations. Each of the copolymers was used to form a pressure sensitive adhesive composition using the formulation shown in Table II.

TABLE II

| Adhesion Formulation | |
|---|---|
| Parts by Weight | Ingredients |
| 10 | Copolymer (Example I) |
| 10 | Tackifier (Foral ® 85) |
| .1 | Antioxidant (Irganox 1076) |
| 37.3 | Naphtha |
| 9.3 | Toluene |

The composition was mechanically shaken for 16 hours to completely dissolve the ingredients. Solution viscosity was measured using a Brookfield Viscometer, Model RVT-E, No. 7 spindle. Two pressure sensitive adhesive properties were determined on the formulations, namely, holding power and probe tack.

Holding power was measured at 105° C. according to the Pressure Sensitive Tape Council's Test Method PSTC-7 that consists of overlapping one inch of a one inch wide adhesive coated 2-mil Mylar film strip onto a stainless steel plate, and then after conditioning, imposing a two pound continuous load on the specimen in a direction coaxial to the length of the adhesive coated Mylar film and measuring the time required for the specimen to move 0.0625 inches (0.159 cm).

Probe tack was measured by means of a 0.0625 inch (0.159 cm) diameter polished stainless steel probe, ASTM 221 (64) 1957, in a "Polyken" probe tack tester, the probe being adhered to the adhesive by a static weight of 100 grams per square centimeter for 1 second and removed at a rate of 0.5 centimeters per second.

The adhesive properties obtained with the various copolymers is set forth in Table III.

TABLE III

| Formulation No. | TBC, ppm[a] | Adhesive Properties | | |
|---|---|---|---|---|
| | | AFV[b] Pa.S | Probe[c] Tack, g | Holding Power, hrs.[d] |
| 1 | 0 | 2.36 | 608 | 1.0 |
| 2 | 5 | 2.36 | 476 | 2.7 |
| 3 | 10 | 2.05 | 518 | 2.2 |
| 4 | 25 | 2.34 | 734 | 2.6 |
| 5 | 50 | 2.62 | 602 | 1.1 |
| 6 | 100 | 2.36 | 508 | 1.2 |

[a]Tertiary-butylchloride as parts per million parts cyclohexane present during polymerization.
[b]Adhesive Formulation Viscosity at 25° C. measured by Brookfield Viscometer.
[c]Determined according to ASTM 221 (64) 1957.
[d]Determined according to Pressure Sensitive Tape Council's Test Method PSTC-7.

The data indicates that copolymers made in the presence of about 5 to about 30 parts tertiary butylchloride per million parts of cyclohexane solvent contribute to higher holding power than copolymers prepared without or greater than about 50 parts per million of tertiary butylchloride. Probe tack adhesive strength and solution viscosity does not seem to be significantly altered.

What is claimed is:

1. A method for producing a branched copolymer comprising copolymerizing conjugated diene monomers and monovinylaromatic monomers using a monolithium initiator and then reacting the resulting lithium terminated polymer segments with a coupling agent having at least three functional groups capable of reacting with the resulting lithium terminated polymer segments to couple said coupling agent and the lithium terminated polymer segments, said method being further characterized in that the copolymerization is carried out in the presence of an amount of tertiary butylchloride that will improve the holding power that the polymer will impart to a pressure sensitive adhesive composition.

2. A method according to claim 1 wherein the tertiary butylchloride is employed in an amount in the range of about 30 to about 165 parts by weight per million parts by weight of total comonomers.

3. A method according to claim 2 wherein said branched copolymer is a branched block copolymer produced by reacting monovinylaromatic comonomer with the organolithium initiator until substantially all of the aromatic comonomer is polymerized, then adding to the resulting lithium terminated polymer conjugated diene comonomer, continuing the polymerization until substantially all of the diene comonomer is polymerized and then adding the coupling agent to form the coupled copolymer.

4. A process according to claim 3 wherein the copolymer has a molecular weight in the range of about 100,000 to about 500,000 and the ratio of conjugated diene to monovinylaromatic monomer is in the range of about 50/50 to about 90/10.

5. A process according to claim 4 wherein a copolymer of styrene and 1,3-butadiene is formed.

6. A process according to claim 5 wherein the organolithium initiator comprises n-butyllithium and said coupling agent comprises silicon tetrachloride.

7. A process according to claim 6 wherein the weight ratio of 1,3-butadiene to styrene is 70/30 and about 0.1 part by weight of n-butyllithium is employed per hundred parts by weight of total comonomers.

8. A pressure sensitive adhesive composition comprising tackifier, solvent, and a copolymer produced according to any one of claims 1-7.

9. An adhesive in accordance with claim 8 wherein said tackifier is selected from the group consisting of rosin esters, α-pinene, resins, and hydrocarbon resins.

10. An adhesive in accordance with claim 9 wherein said copolymer has a molecular weight in the range of about 150,000 to about 300,000.

11. An adhesive in accordance with claim 10 wherein said copolymer is a block branched copolymer of styrene and 1,3-butadiene and said tackifier is a glycerol rosin acid ester and said copolymer and said tackifier are employed at equal parts by weight.

* * * * *